March 16, 1926.
J. ADAMS ET AL
SCRAPER HITCH
Filed Nov. 7, 1923
1,577,152
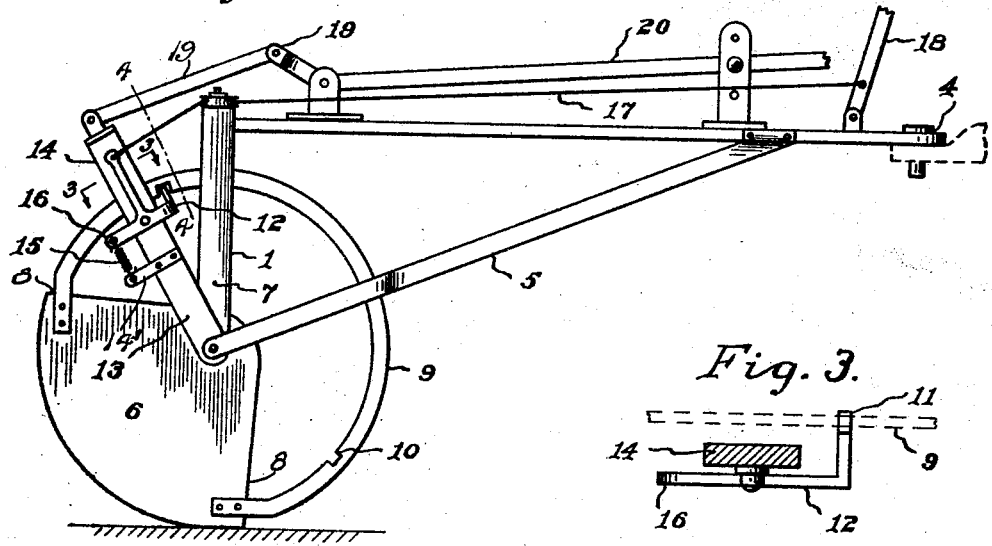
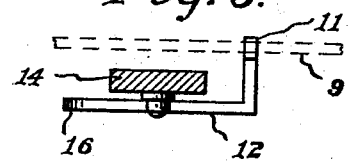
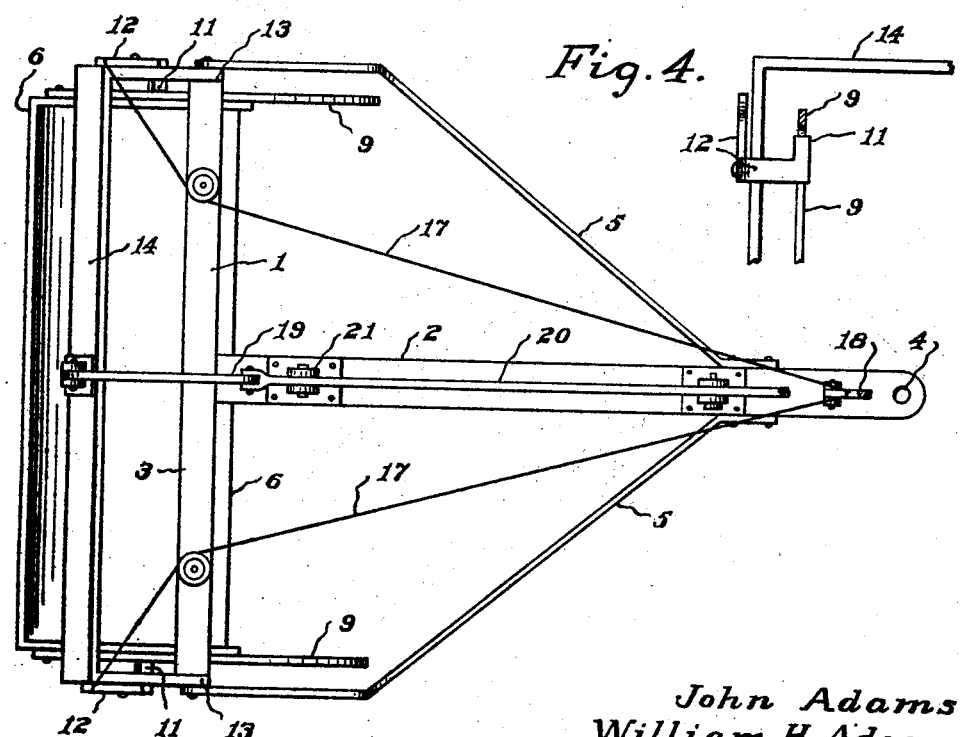
John Adams
William H. Adams.
INVENTORS
BY Victor J. Evans
ATTORNEY Patented Mar. 16, 1926.

1,577,152

UNITED STATES PATENT OFFICE.

JOHN ADAMS AND WILLIAM H. ADAMS, OF BURLINGTON, NEW JERSEY.

SCRAPER HITCH.

Application filed November 7, 1923. Serial No. 673,319.

*To all whom it may concern:*

Be it known that we, JOHN ADAMS and WILLIAM H. ADAMS, citizens of the United States, residing at Burlington, in the county of Burlington and State of New Jersey, have invented new and useful Improvements in Scraper Hitches, of which the following is a specification.

This invention relates to a hitch designed for use in connection with scrapers, of the type used in moving dirt or earth, and an object of the invention is to provide a hitch designed for use in connection with a scraper, by means of which the scraper may be operated from a tractor and by one man.

Another object of this invention is to provide a scraper hitch as specified by means of which a scraper may be operated through its various phases of operation by one control forward movement of a tractor, eliminating the need of backing the tractor to position the scraper for receiving a load, and consequently eliminating not only the loss of time contingent with such reversing action, but also eliminates the wear and tear on the tractor clutch and other mechanism.

Other objects of the invention will appear in the following detail description, and in the accompanying drawing wherein:

Figure 1—is a top plan view of the improved scraper hitch and scraper to show its application thereto.

Figure 2—is a side elevation of the structure as shown in Figure 1 and showing a fragmentary portion of a tractor bar.

Figure 3—is a sectional view taken on line 3—3 of Figure 2.

Figure 4 is a sectional view taken on line 4—4 of Figure 2.

Referring more particularly to the drawing, the hitch comprises a substantially U-shaped frame 1, which has a tongue or coupling bar 2 attached to the upper horizontal portion 3 thereof intermediate its ends. The coupling tongue 2 has its forward end recessed as shown at 4 to permit its connection with the draw-bar of a tractor of any approved type. Diagonal braces 5 have their rear parallel ends extending from the ends of the arms of the U-shaped frame and the forward ends of said braces are attached to the coupling tongue 2 adjacent the forward end thereof.

The scraper proper, which is indicated by 6, is pivotally supported from the depending arms 7 of the frame 1. The ends 8 of the scraper have curved runners 9 attached thereto. The runners 9 are provided with spaced notches 10 formed in their inner perimeters which notches receive the blunt ends 11 of pawls 12. The pawls 12 are pivotally supported by the depending ends 13 of a movable frame 14 which is also substantially in the shape of an inverted U. Springs 15 are connected to the tail ends 16 of the pawls 12 and to a clamp 14' for urging the blunt ends of the pawls into the notches or recess 10 for holding the scraper 6 either in loading or dumped positions. The pawls 12 are rocked upon their pivots to release them from engagement in the recess 10, to permit movement of the scraper 8 by means of cords or flexible members 17 which are connected to a suitable hand lever 18 carried by the coupling tongue 2.

When the scraper is loaded, and it is desired to empty the same, the lever 18 is rocked which will rock the pawls 12 and move them out of certain of the recess 10, which will release the support of the scraper and allow the scraper to swing under gravity action and weight of the load into dumping position and when it moves into dumping position, the pawls 12 will engage in the other notches or recess 10 in the runners and hold the scraper in its dumped position during the travel back for loading position. When the loading point is reached, the lever 18 is again rocked which releases the pawls 12 and the weight of the scraper will cause it to swing into loading position in which it will be held by the pawls 12 engaging in the first notches or recess 10 in the runners 9.

The frame 14 which is pivotally connected to the frame 1 is connected by means of a suitable link 19 to a hand lever 20. The lever 20 is pivotally mounted on a suitable fulcrum 21 carried by the coupling tongue 2. By rocking the lever 20, the relative elevation of the cutting edge of the scraper 6 may be adjusted for regulating the cutting depth of the scraper when in loading position. This action being accomplished by the pawls 12 being positioned in the notches as shown in Figure 2 for moving the scraper in the desired position, and it will also be apparent that the scraper is held in a rigid position by this engagement of the pawls with the notches, therefore the scraper will remain in said position when used for any purpose required or until the pawls are disengaged or the lever 20 actuated for the movement of the frame 14.

From the foregoing description, taken in connection with the accompanying drawing, it will be apparent that the improved scraper heretofore described and illustrated in the drawings, can be operated by a tractor to load and unload, without any reverse or backing action of the tractor, such as is necessary in the approved type of scraper hitches now on the market, and that in consequence of such operation, much time will be saved in the moving of earth, and considerable wear and tear on the tractor clutch and other structure may be eliminated.

It is, of course, to be understood, that the invention may be constructed in various other manners and the parts associated in different relations and, therefore, we do not desire to be limited in any manner except as set forth in the claims hereunto appended.

What we claim is:

1. The combination with an earth moving scraper, of a hitch structure therefor including a coupling frame, said scraper being pivotally connected to said coupling frame, a movable frame pivotally supported relative to the scraper and the coupling frame, runners attached to said scraper, pawls pivotally carried by said movable frame, said runners provided with notches adapted to receive said pawls for holding the scraper in rigid adjusted positions.

2. The combination with an earth moving scraper, of a hitch structure therefor including a coupling frame, said scraper being pivotally connected to said coupling frame, a movable frame pivotally supported relative to the scraper and the coupling frame, runners attached to said scraper, pawls pivotally carried by said movable frame, said runners provided with notches adapted to receive said pawls for holding the scraper in adjusted positions in a manner to prevent rearward or forward movement of said scraper, means for normally urging said pawls into said notches, and manually operated means for releasing the pawls from engagement in the notches.

3. The combination with an earth moving scraper adapted to be carried by a tractor, of a hitch structure therefor including a coupling frame, said scraper being pivotally connected to said coupling frame, a movable frame pivotally supported relative to the scraper and the coupling frame, runners attached to said scraper, pawls pivotally carried by said movable frame, said runners provided with notches adapted to receive said pawls for holding the scraper in adjusted positions, means for normally urging said pawls into said notches, manually operated means for releasing the pawls from engagement in the notches, means capable of adjustment and connected to said coupling frame and said movable frame for regulating the cutting depth of the scraper through the medium of the pawls and notched runners and rigidly retaining said scraper in its adjusted position, and said last mentioned means together with the pawl releasing means having control means disposed in easy reach of the operator of the tractor for convenient operation and easy control of the scraper.

In testimony whereof we affix our signatures.

JOHN ADAMS.
WILLIAM H. ADAMS.